Aug. 9, 1938.     A. BAUD     2,126,442
CRUDE OIL ENGINE
Filed Feb. 5, 1936
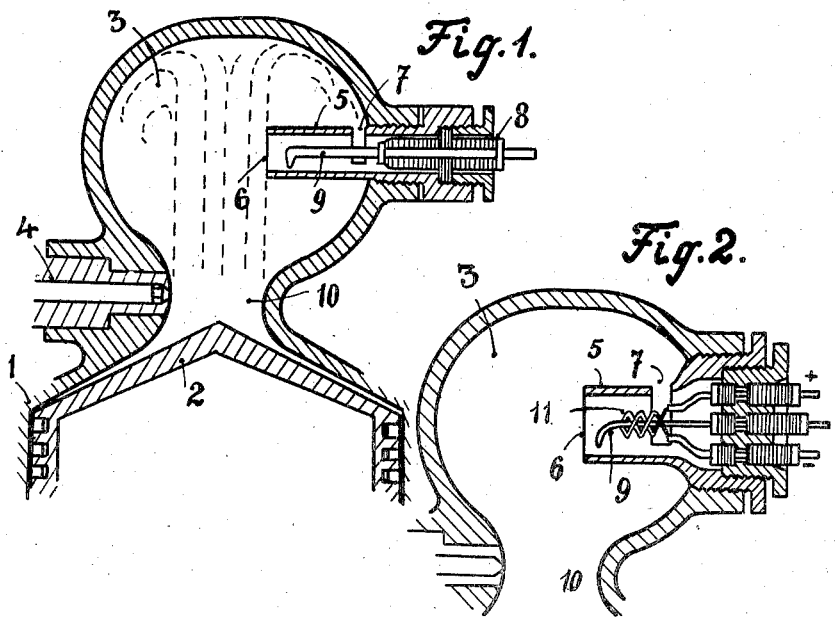
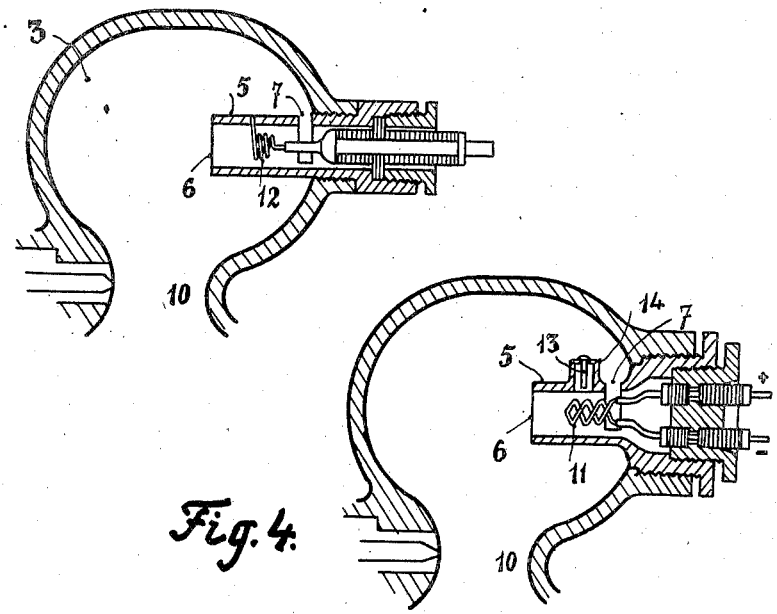
INVENTOR
ALBERT F. BAUD
By William C. Linton
ATTORNEY Patented Aug. 9, 1938

2,126,442

UNITED STATES PATENT OFFICE 2,126,442

CRUDE OIL ENGINE

Albert Baud, Paris, France

Application February 5, 1936, Serial No. 62,517
In France February 13, 1935

1 Claim. (Cl. 123—33)

The present invention refers to internal combustion engines, especially those using crude oils as the combustible therein. The type of crude oil engine of the present device differs from that of the Diesel type in that in the Diesel type engine a mixture of air and a combustible under a strong compression creates the explosive force, whereas, in the present device the mixture of air and a combustible is under a low pressure and the air is admitted to the chamber of combustion in a constant volume. In the operation of the motor with low compression, the oil is injected under pressure into the chamber of combustion of the motor and mixed with air and directed towards a heating element maintained constantly in condition to ignite the combustible mixture.

The principal object of the present device is to provide means for treating the combustible mixture of air and a combustible in two phases, the first phase is that in which the combustible mixture is broken up and placed in a violent turbulence and the second phase is that in which the combustible is placed under a retarded circulation in the interior of a tube containing the ignition means after first receiving a mixing of the air and combustible.

A further object of the present invention is the provision of means for creating a retarded continuous circulation of the combustible mixture immediately around the igniting means and heating means.

A further object of the present invention is to provide means whereby the combustible mixture is ignited by an ignition means maintained constantly in condition to ignite the combustible mixture at a time when said mixture is completely formed and the cylinder compressing the same is at the top of its compression stroke.

And a still further object of the present invention is the provision of a heating means for starting a crude oil low compression engine in combination with igniting means for the continuous operation of said engine which is made incandescent by the heat of the starting explosions.

The construction of the compression chamber in conformity to the invention is set forth with reference to the accompanying drawing which shows various forms of construction.

Inasmuch as the constructon of internal combustion engines is well known at the present time, the drawing shows only the compression chamber with the hollow device and the means for ignition.

Fig. 1 is a sectional view of the compression chamber adapted for spark ignition, also showing the connection between said chamber and the engine cylinder.

Fig. 2 shows the method for spark ignition, with a heating device which is used for starting purposes.

Fig. 3 shows the means employed for ignition by incandescent filament.

Fig. 4 relates to the self-ignition device, with the use of a heating filament employed for the starting.

Referring to Fig. 1, 1 is the upper part of the engine cylinder, 2 the piston in the latter, 3 the compression chamber, 4 the injector for the liquid fuel, 5 the hollow body which is provided with two orifices 6 and 7; 8 is the ignition electrode which is insulated by means of an insulating sleeve 9.

In this device, the source of current is connected on the one hand to ground and on the other hand to the electrode 8. This form of construction does not comprise a heating device.

To start the engine, the operation begins by running it upon gasoline. The hollow body 5 becomes heated. Its mass and its position are calculated in such manner that it will always maintain a sufficient temperature to heat the air which is expelled by the piston 2 and which proceeds, through the communicating orifice 10 into the compression chamber 3, into which liquid fuel has been injected by means of the injector 4. This heating is such that it provides for ready ignition of the gas mixture by means of the electric spark which is formed between the pointed end of the electrode 8 and the wall of the hollow body 5. When the said hollow body becomes sufficiently heated, the supply of gasoline is cut off, and the engine continues to run upon crude oil.

It is to be more particularly remarked that by reason of a scavenging of the orifice 6 of the hollow body by a stream of gas which is shown in the dotted lines and which enters the compression chamber through the orifice 10, a slight vacuum is produced in the hollow body 5, and a gas circulation is set up therein by the orifices 7 and 6, which facilitates the heating of the fuel gas by the heat stored up in the hollow body, and its ready ignition, as well as the cooling of the electrode 8.

Fig. 2 shows a device which is similar to the one shown in Fig. 1, but in this case the electrode 8 is surrounded by a heating winding 11.

In this device, in order to start the engine, the current is sent into the filament 11, which heats the fuel mixture, and thus the engine can be set running directly with crude oil. When the engine has been heated up, the circuit of the filament 11 is broken, and the electric spark, as before, effects the ignition of the fuel gas.

Fig. 3 shows the method of effecting the ignition of the fuel gas by means of a filament 12 which also serves to heat the gas mixture and to ignite the same. Otherwise, the operation is the same as in the preceding case.

Fig. 4 shows a form of construction of the self-ignition device which comprises a heating filament for starting purposes.

For this purpose, the hollow body 5 contains a small metallic rod 13, for instance, which is riveted to the wall of the said body. The said rod is mounted in hollow body in the same manner as in the device shown in Fig. 2.

In order to start the engine which is provided with this device, the operator begins by sending the current into the filament 11, and he then starts the engine. After it has been running for a certain time, and when the compression chamber is sufficiently heated, the member 13 will heat up to a greater degree than the hollow body, since it is protected from the circulation of fresh gas, and it thus constitutes the point at which the fuel gas can be ignited. At this time, the circuit of the filament 11 can be broken, and the member 13 provides for the ignition of the fuel gas.

As above stated, since the fuel gas is already heated by its contact with the hollow body, it will be ignited when in contact with the member 13, at a much lower pressure than in the known internal combustion engines, and this pressure may be practically the same as in the usual gasoline engines.

In this manner, the new device permits, as above stated, to reduce the weight of the engine and to set it running, from the start, with crude oil, without the aid of electric ignition, when once the engine has been started (Fig. 4). This affords a considerable economy, as to expense for fuel and for the construction of the engine.

On the other hand, the ignition devices for the engine, for instance the devices shown in Fig. 4, are of a strong construction, and will operate for a long time.

Again, the said hollow body which is mounted according to the invention in the compression chamber of the engine, is adapted, by reason of the circulation of gas within the said body, to cool the ignition devices which are situated in the interior of the latter; if such devices are protected against the gas circulation (Fig. 4) they will be heated to the required temperature. The arrangement of the parts within the hollow body, the position, the form and the mass of said body, and thus to provide for the ignition, and chiefly in the devices shown in Figs. 2, 3 and 4. On the other hand, the hollow body, by retaining a certain quantity of heat after each cycle, will heat the fuel gas, and thus it can be more readily ignited, especially when starting.

What I claim is:

An improvement in internal combustion engines comprising an engine cylinder, a globular ignition chamber mounted above said engine cylinder, a restricted passage formed at the base of said ignition chamber and connecting said engine cylinder with said ignition chamber, said ignition chamber having a concave inner top wall surface opposite said passage, a fuel injection device mounted so as to eject the fuel across said restricted channel, ignition means mounted transversely to said restricted channel and extending from a side wall of said globular ignition chamber, a tube surrounding said ignition means and extending from said side wall of said globular ignition chamber, said tube having an opening formed in the top portion thereof near said side wall of said globular ignition chamber for the entrance of combustibles moving from the uppermost portion of said ignition chamber downwardly along said side wall of said ignition chamber, and the outer end of said tube being formed open and projecting into the path of the combustible flowing through said passage for drawing by suction the combustible from said tube during a period of compression as the compressed combustible is being forced from the engine cylinder upwardly past the outer end of said tube.

ALBERT FRANÇOIS BAUD.